(12) United States Patent
Safadi et al.

(10) Patent No.: US 7,120,926 B1
(45) Date of Patent: Oct. 10, 2006

(54) METHOD AND SYSTEM OF IDENTIFYING SOFTWARE AND FIRMWARE OBJECTS AVAILABLE FOR DOWNLOAD OVER A NETWORK SUCH AS A CABLE TELEVISION SYSTEM

(75) Inventors: Reem Safadi, Horsham, PA (US); Lawrence Vince, Lansdale, PA (US); Douglas S. Makofka, Willow Grove, PA (US); Christopher Poli, Doylestown, PA (US); Christopher S. Del Sordo, Souderton, PA (US); Robert C. Booth, Jamison, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/565,302

(22) Filed: May 4, 2000

Related U.S. Application Data

(60) Provisional application No. 60/152,102, filed on Sep. 2, 1999.

(51) Int. Cl.
*H04N 7/173* (2006.01)
*H04N 7/16* (2006.01)
(52) U.S. Cl. ........................ 725/132; 725/140; 725/152
(58) Field of Classification Search ................ 725/131, 725/132, 139, 140, 151, 152, 134, 142; 705/51, 705/57; 463/40
See application file for complete search history.

(56) References Cited

U.S. PATENT DOCUMENTS

| | | | |
|---|---|---|---|
| 5,181,107 A | * | 1/1993 | Rhoades ..................... 725/105 |
| 5,440,632 A | | 8/1995 | Bacon et al. |
| 5,544,161 A | * | 8/1996 | Bigham et al. ............. 370/397 |
| 5,635,979 A | * | 6/1997 | Kostreski et al. ........... 725/132 |

(Continued)

FOREIGN PATENT DOCUMENTS

EP 0 399 200 11/1990

(Continued)

OTHER PUBLICATIONS

Written Opinion from International Preliminary Examination Authority, dated Jul. 24, 2001.

(Continued)

*Primary Examiner*—Chris Kelley
*Assistant Examiner*—Joseph G. Ustaris
(74) *Attorney, Agent, or Firm*—Lawrence T. Cullen

(57) ABSTRACT

This method and system allow a subscriber to a cable television service to receiving a listing or menu of programming available for that subscriber's set-top terminal to upgrade or enhance the features available over the cable system. A Directory of Services (DoS) message is transmitted over the cable system to the subscriber's set-top terminal. The terminal can then display for the subscriber the menu of programming available. This display may include a price for downloading each programming object. The subscriber can then, using a remote control unit or a user input device on the terminal, direct the set-top terminal to acquire a listed programming object. The DoS message will provide information enabling the set-top terminal to download the indicated programming object from the cable system in response to the subscriber's input. The subscriber can then have immediate access to upgraded or enhanced programming, the purchase of which is billed to the subscriber's account.

33 Claims, 4 Drawing Sheets

U.S. PATENT DOCUMENTS

| | | | |
|---|---|---|---|
| 5,654,746 A * | 8/1997 | McMullan et al. | 725/29 |
| 5,727,065 A * | 3/1998 | Dillon | 705/52 |
| 5,768,539 A * | 6/1998 | Metz et al. | 709/249 |
| 5,818,935 A | 10/1998 | Maa | |
| 6,166,778 A * | 12/2000 | Yamamoto et al. | 348/569 |
| 6,212,278 B1 * | 4/2001 | Bacon et al. | 380/240 |
| 6,312,336 B1 * | 11/2001 | Handelman et al. | 463/40 |
| 6,515,680 B1 * | 2/2003 | Hendricks et al. | 715/716 |
| 6,532,591 B1 * | 3/2003 | Arai et al. | 725/132 |
| 6,651,250 B1 * | 11/2003 | Takai | 725/31 |
| 6,675,388 B1 * | 1/2004 | Beckmann et al. | 725/136 |
| 6,792,616 B1 * | 9/2004 | Jerding et al. | 725/38 |
| 2002/0116706 A1 * | 8/2002 | Bahraini | 725/32 |

FOREIGN PATENT DOCUMENTS

| | | |
|---|---|---|
| EP | 0 848 341 | 6/1996 |
| EP | 0 822 718 | 2/1998 |
| EP | 0 905 984 | 3/1999 |
| WO | 97/30549 | 8/1997 |
| WO | WO-97/30549 | 8/1997 |

OTHER PUBLICATIONS

International Preliminary Examination Report, dated Dec. 6, 2001.

* cited by examiner

METHOD AND SYSTEM OF IDENTIFYING SOFTWARE AND FIRMWARE OBJECTS AVAILABLE FOR DOWNLOAD OVER A NETWORK SUCH AS A CABLE TELEVISION SYSTEM

This application claims the benefit of U.S. Provisional Application No. 60/152,102 filed on Sep. 2, 1999.

RELATED APPLICATIONS

The subject matter of the present application is related to that of a previously-filed application, U.S. Ser. No. 09/257,274, filed Feb. 24, 1999.

FIELD OF THE INVENTION

The present invention relates to the field of programming a set-top terminal of a cable television system, particularly upgrading or expanding the software or firmware in the set-top terminal. More particularly, the present invention relates to the field of providing a directory of available code objects that can be downloaded by the set-top terminal at the instigation of the user of the set-top terminal.

BACKGROUND OF THE INVENTION

In a typical cable television system, subscribers are provided with a set-top box or terminal. The set-top terminal is a box of electronic equipment that is used to connect the subscriber's television, and potentially other electronic equipment, with the cable network. The set-top box is usually connected to the cable network through a co-axial wall outlet.

The set-top box is essentially a computer that is programmed to process the signals from the cable network so as to provide the subscriber with the cable services. These services from the cable television company typically include access to a number of television channels. Additionally, premium channels may also be provided to subscribers at an additional fee. Pay-per-view events and video-on-demand service may also be provided over the cable network. The set-top box is programmed to provide these services to the subscriber.

However, the services of the cable company need not be limited to providing television programming. Some cable companies are now offering internet access and e-mail over the cable network at speeds much faster than available over conventional telephone lines. It is anticipated in the future that more and more services will be provided over the cable network, including even basic telephone service. Eventually, each home or office may have a single connection, via the cable network, to all electronic data services.

As the cable network and the services provided evolve, the set-top terminal must also evolve to be able to provide subscribers with all the services of the cable network. This set-top box evolution will primarily involve changes to the programming of the set-top box. By upgrading the software or firmware of the set-top box, the box can be made to perform more efficiently or offer new services as the cable network evolves.

In order to upgrade the population of set-top boxes on a cable network, it is preferable to transmit the new programming to the set-top boxes via the cable network itself. Otherwise, a technician must visit each subscriber to upgrade the set-top boxes. Such field upgrades would obviously be at significant expense.

The headend is the facility from which the cable network operator broadcasts television signals and provides other services over the cable network. Updated software that is provided to the population of set-top terminals can be broadcast from the headend over the cable network.

As the services available over the cable network increase, some users will wish to pay for the additional services. In contrast, other subscribers will avoid the increased cost of some services. Over time, new subscribers will enter the network and select the services they desire. Existing subscribers may also wish to expand their use of the services offered. Either situation will require that the appropriate programming for implementing the desired service or services be added to that subscriber's set-top terminal. In such a case, the subscriber would presumably have to contact the cable system operator or service provider to have his or her set-top terminal programmed to offer the new service or services.

This, however, entails some amount of effort on the part of the subscriber. Consequently, such additional services will not commonly be purchased on impulse, thereby decrease the sales of such services by the service provider. Moreover, the service provider will need to maintain and staff a facility for receiving and responding to those orders for additional services that are made.

Consequently, there is a need in the art for a method and system whereby subscribers can order, on impulse, and receive additional or upgraded programming for their set-top terminals without contacting the service provider. There is a further need in the art for a method and system that allows the system operator to support this upgrade service for subscribers at minimal cost, i.e., with automatic electronic delivery that does not require staff to take and fill subscriber requests for additional or upgraded programming.

SUMMARY OF THE PRESENT INVENTION

The present invention meets the above-identified needs and others. Specifically, it is an object of the present invention to provide a method and system by which subscribers to a cable or other computer network can, on impulse and on demand, select, purchase, download and implement additional or upgraded programming for their set-top terminals. The method and system of the present invention further aim to allow the system operator to support this upgrade service for subscribers at minimal cost, i.e., with automatic electronic delivery that does not require staff to take and fill subscriber requests for additional or upgraded programming.

According to the present invention, additional or upgraded code objects which subscribers may wish to acquire to enhance the services received through their set-top terminal are transmitted by or available from the headend. A directory of services (DoS) message is sent to the set-top terminals to advise them what programming is available and to instruct the set-top terminals where to acquire the programming should the subscriber signal a desire to acquire it.

More specifically, the present invention may be described as a method of advising a subscriber to a cable television system of programming that may be purchased over the cable television network to upgrade or enhance features provided by that subscriber's set-top terminal and for providing such programming selected by the subscriber to that subscriber's set-top terminal. The method of the present invention includes the action of transmitting a message to the set-top terminal that provides a directory of programming available for purchase and download over the cable television system.

The method of the present invention proceeds with displaying the directory of programming on a display device; and receiving a selection of programming from the directory through a user input device of the set-top terminal. In response to a selection of programming, the method proceeds with downloading selected programming in accordance with the selection received through the user input device and based on location information for the selected programming provided in the directory message from the headend.

This downloading may be approached in at least two different ways. First, the downloading may be performed by tuning a data transport stream specified in the directory message from the headend in connection with the selected programming. Alternatively, the downloading may be performed by the set-top terminal connecting to a site identified by a URL specified in the directory message from the headend at which the selected programming is stored.

The method of the present invention may also include checking the credit rating of the subscriber in response to the selection of programming. Preferably, the downloading of selected programming is only performed if the credit check of the subscriber is favorable.

Finally, the method of the present invention may include specifically addressing the directory message to one or more set-top terminals in the cable television system. This may be done where certain subscribers have paid to receive the directory message. In which case, the message is specifically addressed to set-top terminals of subscribers who have paid to receive the message.

Additionally, the present invention also encompasses the system necessary for performed the above-described method. Specifically, the present invention encompasses a system for advising a subscriber to a cable television system of programming that may be purchased over the cable television network to upgrade or enhance features provided by that subscriber's set-top terminal and for providing such programming selected by the subscriber to that subscriber's set-top terminal. For example, the system of the present invention includes a headend facility from which a cable television signal and data objects are transmitted to a population of set-top terminals over the cable television system; and a transmitter at the headend facility for transmitting the directory message to the set-top terminals, where the message provides a directory of programming available for purchase and download over the cable television system.

BRIEF DESCRIPTION OF THE DRAWINGS

The drawings are a part of the specification and may be used to better understand the present invention. In the drawings.

DETAILED DESCRIPTION OF THE INVENTION

Figure 1:
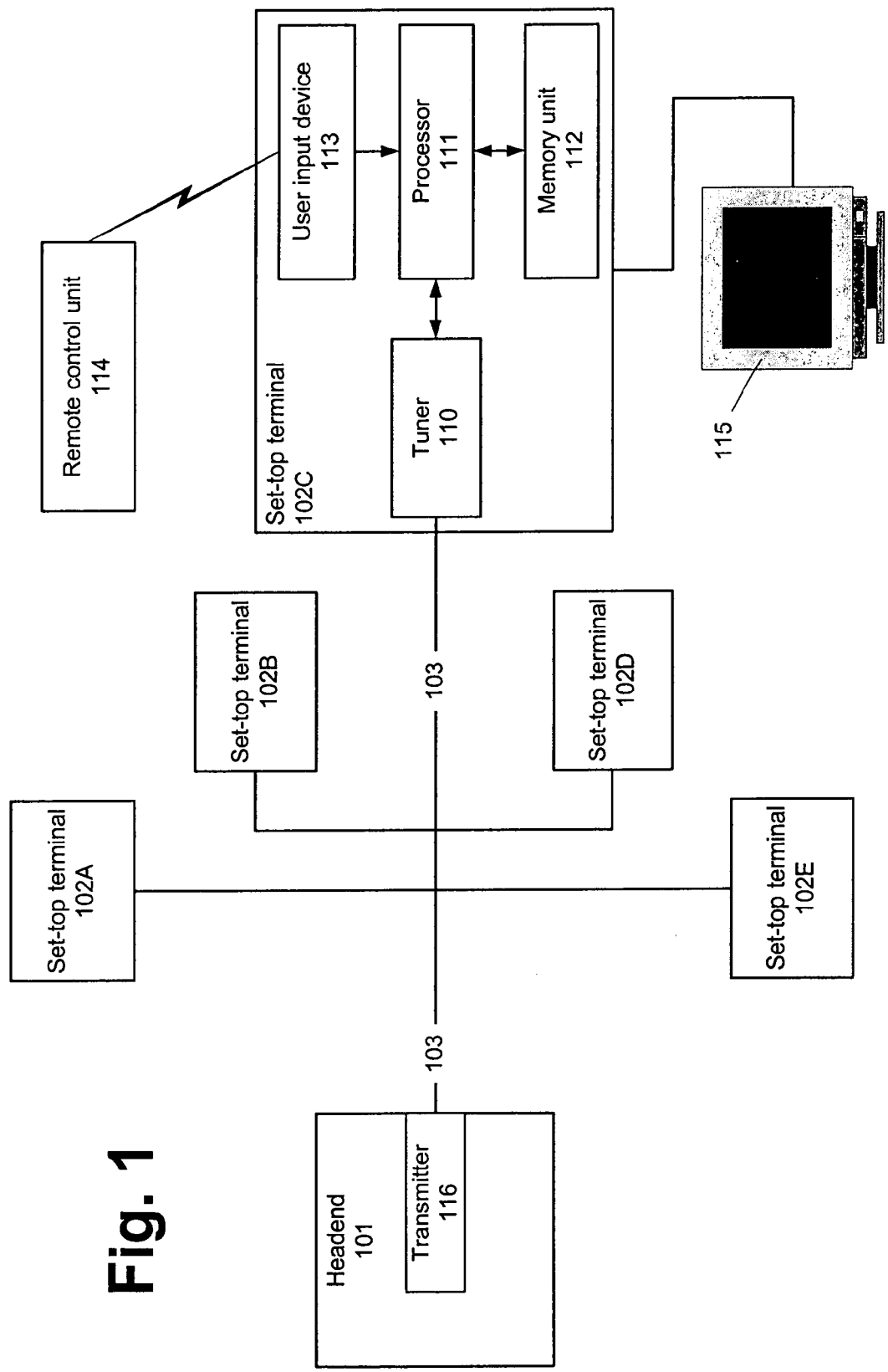
FIG. 1 is a block diagram of a cable network including a headend and a population of set-top terminals with which the present invention is practiced.

According to the present invention, a directory of services ("DoS") message is transmitted by the service provider over the cable network (103) to the individual set-top terminals (102). Preferably, the DoS message is transmitted from the headend (101) using the headend transmitter (116). The DoS message provides the information necessary to allow any set-top terminal (102) to locate and download a software or firmware code object from within the signal provided by the headend (101) over the cable network (103).

As shown in FIG. 1, the headend facility (101) is connected via a cable network (103) to a population of set-top terminals (102). Each set-top terminal (102) is possessed and used by a particular subscriber to the cable service. Each set-top terminal (102) includes a processor (111) with a memory unit (112). The memory unit (112) contains programming and data accessed by the processor (111) to provide those services available over the cable service which that subscriber wishes to receive.

In the event that a subscriber, perhaps a new subscriber, wishes to add to the services received, he or she typically needs to acquire additional or upgraded programming in the form or software or firmware required to enable his or her set-top terminal (102) to provide the newly desired service or services. This new programming is stored in the memory unit (112) for execution by the processor (111). As used herein, a programming code object, or code object, refers to an individual piece of software or firmware that is acquired, stored or executed by the set-top terminal (102). More generally, the term "data object" refers to any data structure transmitted by the headend (101) to the set-top terminals (102). Consequently, a data object may be a message, instruction, data structure or code object.

In addition to providing services, such as a cable television signal, the headend (101) can also transmit instructions and programming code objects to the set-top terminals (102) directly over the cable network (103) using the transmitter (116). Thus, the subscriber wishing to upgrade or add to the programming in his or her set-top terminal (102) so as to take advantage of additional service offered over the cable system can download the necessary programming with his or her set-top terminal (102) from off of the cable network (103). This avoids the need for a technician to visit the subscriber to add programming to the memory unit (112).

Messages and programming may be routinely broadcast by the headend (101) over the cable network (103). These messages and programming are typically "packetized," meaning that the data of the message or the software or firmware is divided into discrete "packets" of data. Each packet includes a header that identifies the message or object of which it is a part and identifies the position of that particular packet within the message or object to which it belongs. Consequently, the processor (111) of the set-top terminal (102) collects the packets of the message or object being acquired and reassembles the packetized data into the needed message or object as sent by the headend (101). More specifically, the packets of each data object being transmitted bear a unique packet identifier (PID) number, or other identifier, within the packet transport stream, or PID stream. Each PID number (or other identifier) identifies the packets that bear that number/identifier as belonging to a particular data object being transmitted.

With transmitted data objects being packetized, numerous data objects can be broadcast simultaneously by interspersing the packets of the various objects being transmitted.

These streams of data packets can be sent on both in-band and out-of-band (OOB) channels of the cable television signal sent from the headend (101) to the set-top terminals (102). The tuner (110) of each set-top terminal (102) is controlled by the processor (111) to tune channels, both in- and out-of-band, as necessary so that the processor (111) can receive data from the headend (101) via the one or more data transport streams output by the headend (101).

Like all other data objects, the DoS message of the present invention is transmitted to the set-top terminals (102) by the headend (101) over the cable network (103). Preferably, the DoS message is delivered as a sub-message within the OOB Network message identified by the OOB Network PID. The DoS message may or may not be sent in segments depending primarily on its size. In any event, when the DoS message is received by the set-top terminals (102), it will provide the following information.

The DoS message is a directory of the code objects that are being transmitted over the cable network (103) that are available for download by the set-top terminals (102). As discussed above, these code objects, if purchased, received and executed, typically increase or enhance the services provided by the set-top terminals (102). In the past, subscribers have not been able to, on impulse, identify and acquire additional or upgraded programming available to enhance or increase the services provided to them over the cable network (103). With the present invention, the DoS message provides a means of advising subscribers what additional or upgraded programming is available and a means of instructing the set-top terminals (102) as to how and where, in the incoming signal, to acquire those objects at the direction of the subscriber.

The set-top terminals (102) take the information from the DoS message and preferably display it for subscribers. Consequently, either on a television or computer monitor (115) attached to the terminal (102) or, perhaps, on a display of the terminal itself, the terminal (102) can display a directory, either a listing or categorized menu, of the code objects available for download to increase or enhance the services provided. The DoS message may also include, and the terminal (102) display as part of the directory, a description of the function or functions of each available object and the fee that will be charged to the subscriber's account if the object is purchased and downloaded. The subscriber can then respond to the offerings displayed by the terminal (102) using, for example, a remote control unit (114) or other user input device (113), for example a keypad on the set-top terminal itself, and instruct the set-top terminal (102) to acquire the indicated code object or objects. As will be understood by those skilled in the art, the user input device (113) of the present invention may be any user input device with which a user can indicate a selection from the directory of programming displayed in response to the DoS message. The user input device (113) may include, but is not limited to, a keypad, buttons, switches, a knob, a dial, a trackball, a trackpad, a touch-sensitive display, etc. The user input device (113) as shown in FIG. 1, may also include a receiver for receiving a signal from a remote control unit (114).

The DoS message also identifies for the set-top terminal (102) the location of each listed code object and its corresponding entitlement control data structure (ECDS). To specify the location of a code object or its ECDS, the DoS message lists the channel or frequency of the transport stream, in-band or out-of-band, at which the packets for that code object or its corresponding ECDS are being transmitted, typically carouseled with the packets of other data objects. The set-top terminal (102) then tunes to that transport stream using the tuner (110). The DoS message may also specify directly, or reference through a table, the PID of the packets carrying the listed code object or ECDS. The processor (111) of the set-top terminal (102) can then acquire all the packets with that PID number and reassemble the collected data into the programming object to be acquired or its ECDS.

Alternatively, the cable network (103) may be organized as computer network using URLs or universal resource locators to specify the address of downloadable code objects. Consequently, the DoS message may specify the location of a listed code object and its corresponding ECDS by URL for download by the set-top terminal (102).

The ECDS is transmitted or stored separately from its corresponding code object and is used to authorize and authenticate the code object. Using the data of the ECDS, the processor (111) of the set-top terminal (102) can verify that it has downloaded the appropriate code object and that the code object has been received correctly without inadvertent or malicious alteration. It is obviously important for the set-top terminal (102) to be able to authenticate and authorize the received code object before that object is executed by the set-top terminal (102). This allows the system operator to prevent subscribers re-programming their set-top terminals to enable the receipt of unauthorized services for which the subscriber has not subscribed and paid. Authorization and authentication using an ECDS also helps avoid the introduction of, for example, a virus to the cable system. The ECDS may also specify a valid time period or lifetime for the corresponding code object. The ECDS may also be used to specify the cost of downloading the object to the subscriber.

In a preferred embodiment, the DoS message of the present invention should include the following information: (1) a message version number that is incremented each time the directory of services is altered and so indicates if the directory message has been updated; (2) a table compatibility identifier that specifies the executable environment of available code objects, e.g., uSoft™, WinCE™, Sun JVM™, @home Navshell™ or Prevue™ EPG (electronic program guide); and (3) the number of objects listed.

For each listed object, the DoS message will preferably include: (1) a unique object identifier that may be assigned by the service provider or system operator; (2) an object class description indicating the use class of the object (e.g., platform, operating system, application, etc.) offered for download; (3) the name of the object, preferably in ASCII text; (4) the version of the object; (5) the storage classification of the object, e.g., volatile memory, non-volatile memory, doesn't matter, etc.; (6) the object size, preferably the ROMMABLE size (in bytes) of the encapsulated object not including the size of the static variable required for operation of the code object; (7) an indicator of whether the code may or may not be relocated to Flash memory as part of later de-fragmentation during the lifetime of the set-top terminal; (8) a description of the object's function; (9) the object's location, e.g., transport stream channel and PID or URL; (10) the length of the object location field; (11) the location of the object's corresponding ECDS, e.g., transport stream channel and PID or URL; and (12) the length of the ECDS location field.

It will also be recognized by those skilled in the art that, within the network (103), each set-top terminal (102) may have a specific address and one or more multi-cast addresses such that the headend (101) can direct messages to specific set-top terminals or to defined groups of terminals sharing a particular multi-cast address. Within the scope of the present invention, the DoS message may be broadcast to all set-top terminals (102) within the network, multi-cast to a particular group of terminals (e.g., 102A and 102B) or single-cast to a particular terminal (e.g., 102A). For example, the service provider may charge additional fees for making the DoS message available to subscribers. Thus, only those subscribers paying the additional fee would receive the DoS in a multi-cast. Additionally, different DoS messages offering different classes of code objects may be made available to specific segments of the set-top terminal population (102).

Figure 2:
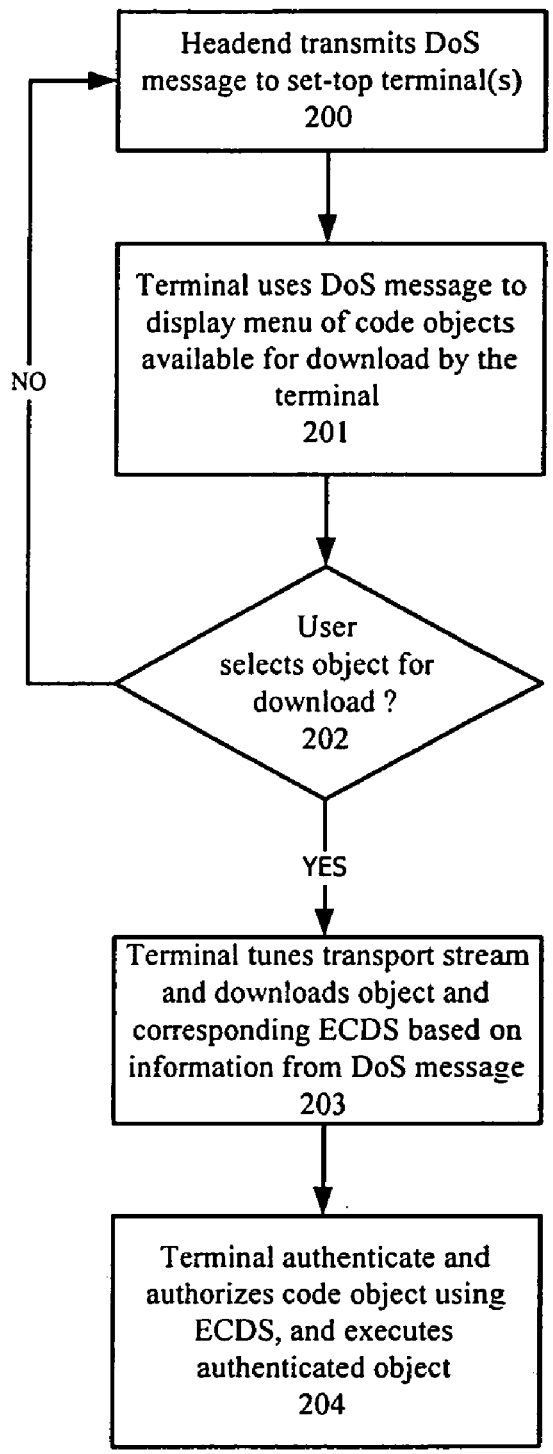
FIG. 2 is a flowchart of a first embodiment of the method of providing code objects to subscribers on-demand according to the present invention.

FIG. 2 is a flowchart summarizing the basic method of the present invention. As shown in FIG. 2, the headend transmits the DoS message to the set-top terminals (200). The set-top terminals query the subscribers by displaying a listing or categorized menu of the objects available for download (201). The subscribers can then indicate a desire to acquire an object or objects from the menu (202). The terminal then uses the data from the DoS message to locate and acquire the indicated object and its corresponding ECDS (203), i.e., by tuning to the specified channel and data transport stream and acquiring the data packets bearing a specified identifier. The processor (111) then authenticates the object using the ECDS and implements the object, provided that it passes the authentication check (204).

Consequently, under the principles of the present invention, individual subscribers have control over the purchase and acquisition of enhanced or upgraded programming for their set-top terminals and can, on impulse, acquire new programming over the cable network without contacting or being visited by a representative of the service provider.

Figure 3:
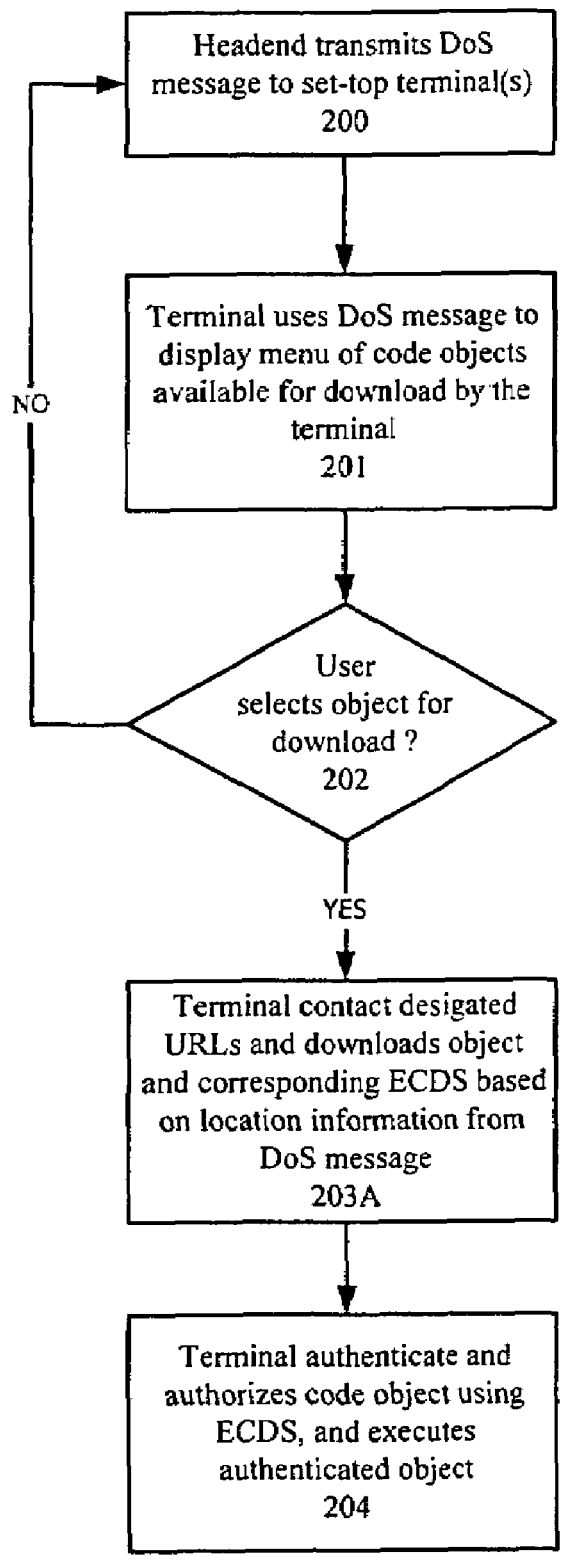
FIG. 3 is a flowchart of a second embodiment of the method of providing code objects to subscribers on-demand according to the present invention.

FIG. 3 provides a flowchart for a second embodiment of the method of the present invention. The method illustrated in FIG. 3 is substantially similar to that of FIG. 2 in which the headend transmits a DoS message (200) which is received by the set-top terminal and used to display a director of programming available for download (201). However, as shown in FIG. 3 and as noted above, the DoS message may specify a URL at which a listed code object or its ECDS may be acquired by the set-top terminal. Consequently, upon the user selecting an object for download (202), the set-top terminal may connect to the site designated by the specified URL and, from that site, download either a code object or its corresponding ECDS. (203A).

As in FIG. 2, after the code object and ECDS have been acquired, the terminal authenticates and authorizes the code object using the ECDS. The terminal then executes the code object. (204).

Figure 4:
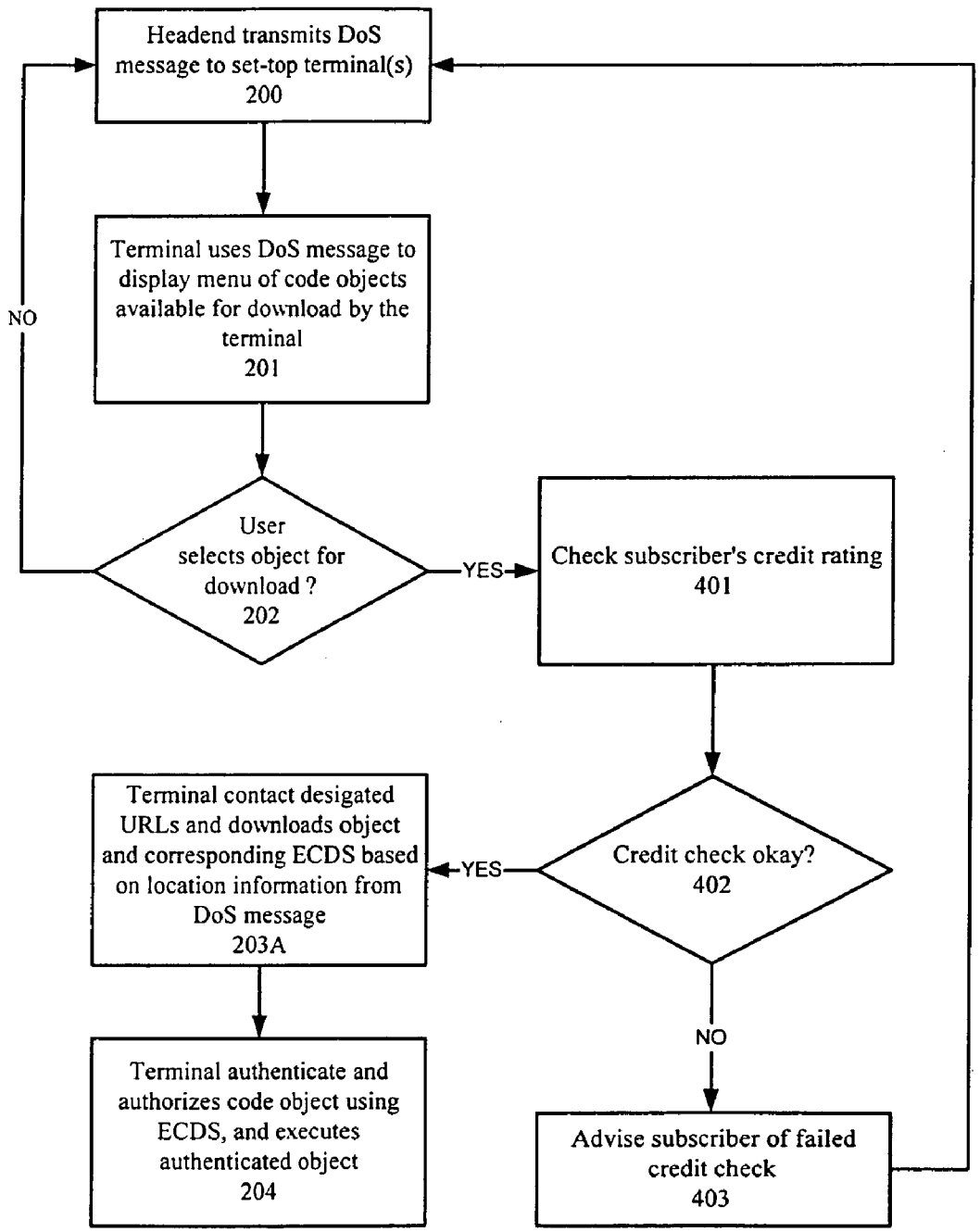
FIG. 4 is a flowchart of a third embodiment of the method of providing code objects to subscribers on-demand according to the present invention.

FIG. 4 provides a flowchart of a third embodiment of the present invention. As shown in FIG. 4, the headend transmits a DoS message (200) which is received by the set-top terminal and used to display a director of programming available for download (201). The user may or may not select a listed object for purchase (202). If the user does select an object for purchase and immediate download, the set-top terminal may first check the subscriber's credit before initiating the instructed download (401).

The credit check of the present invention could be accomplished by signaling the headend (101) for an indication of the subscriber's credit rating and whether the subscriber should be allowed to download the requested programming at that time. Alternatively, the processor (111) may check an internally stored indication of the subscriber's credit limitations. This subscriber credit limitation may be recorded in the memory unit (112) with appropriate security measures, and updated periodically by the headend (101) as warranted.

In either case, if the subscriber's credit rating is satisfactory, the set-top terminal (102) proceeds to download the specified programming and its ECDS by either tuning the designated data transport stream or connecting to the designated URL (204). If the subscriber fails the credit check (402), a message advising the subscriber of the credit problem can be displayed on the television or monitor (115) connected to the set-top terminal or on a display on the terminal itself (403).

The preceding description is merely exemplary and is not intended to limit the scope of the present invention. Those of skill in the art will recognize various modifications and ramifications of the principles of the present invention as described herein. All such details are encompassed by the present invention.

What is claimed is:

1. A method of advising a subscriber to a bidirectional cable television network of executable programming for a set-top terminal that may be purchased over the bidirectional cable television network to upgrade or enhance features provided by that subscriber's set-top terminal and for providing such executable programming selected by said subscriber to that subscriber's set-top terminal, the method comprising:

transmitting a message to said set-top terminal over a bidirectional cable line that provides a directory of programming available for purchase via an upstream communication on said bidirectional cable line and download over said bidirectional cable line associated with said cable television network, said directory listing available programming objects that are configured to be installed and executed by a set-top terminal to enhance functionality of that set-top terminal, said message further including a fee charged for downloading each listed programming object, wherein the message is transmitted in a sub-message with an out of band network message and the message identifies a location of the programming objects and entitlement control data structures corresponding to the programming objects, and wherein the entitlement control data structures are transmitted separately from the programming objects, whereby the set top terminal utilizes the entitlement control data structures to verify that an appropriate code object has been received without alteration.

2. The method of claim 1, further comprising displaying said directory of programming on a display device.

3. The method of claim 2, further comprising receiving a selection of programming from said directory through a user input device of said set-top terminal.

4. The method of claim 3, further comprising downloading selected programming in accordance with said selection received through said user input device and based on location information of said selected programming provided in said message.

5. The method of claim 4, wherein said downloading further comprises tuning a data transport stream specified in said message in connection with said selected programming.

6. The method of claim 4, wherein said downloading further comprises connecting to a site identified by a URL specified in said message in connection with said selected programming.

7. The method of claim 3, further comprising checking a credit rating of said subscriber in response to said selection of programming and downloading said selected programming only if said credit check of said subscriber is favorable.

8. The method of claim 1, wherein said transmitting said message further comprises specifically addressing said message to one or more set-top terminals in said cable television network.

9. The method of claim 8, wherein said specifically addressing said message further comprises specifically addressing said message to set-top terminals of subscribers who have paid an additional fee specifically to receive said message.

10. The method of claim 1, further comprising identifying said Out-of-Band Network Message by an Out-of-Band Network Packet Identification Number.

11. The method of claim 1, further comprising including a message version number in said message, said message version number being incremented each time said directory is changed.

12. The method of claim 1, further comprising listing in said directory a compatibility identifier for each listed programming object that specifies an executable environment for that programming object.

13. The method of claim 1, further comprising specifying in said message a number of programming objects listed.

14. The method of claim 1, further comprising specifying in said message a storage classification for each listed programming object that indicates in what type of memory that programming object is to be stored.

15. The method of claim 1, further comprising specifying in said message a size of each listed programming object.

16. The method of claim 1, further comprising specifying in said message an indicator of whether each listed programming object may or may not be subsequently relocated to Flash memory.

17. The method of claim 1, further comprising charging said subscriber a fee for receipt of said message.

18. A system for advising a subscriber to a bidirectional cable television network of programming that may be purchased over the bidirectional cable television network to upgrade or enhance features provided by that subscriber's set-top terminal and for providing such programming selected by said subscriber to that subscriber's set-top terminal over a bidirectional cable line, the system comprising:
   a headend facility from which a cable television signal and data objects are transmitted to a population of set-top terminals over said bidirectional cable line associated with said cable television network; and
   a transmitter of said headend facility for transmitting a message to said set-top terminals over said bidirectional cable line,
   wherein said message provides a directory of programming available for purchase via an upstream communication on said bidirectional cable line and download over said bidirectional cable line associated with said cable television network, said directory listing available programming objects that are configured to be installed and executed by a set-top terminal to enhance functionality of that set-top terminal, said message further including a fee charged for downloading each listed programming object,
   wherein the message is transmitted in a sub-message with an out of band network message and the message identifies a location of the programming objects and entitlement control data structures corresponding to the programming objects, and
   wherein the entitlement control data structures are transmitted separately from the programming objects,
   whereby the set top terminal utilizes the entitlement control data structures to verify that an appropriate code object has been received without alteration.

19. The system of claim 18, further comprising a display device for displaying said directory of programming from said message received by a set-top terminal.

20. The system of claim 19, further comprising a user input device for receiving a selection of programming from said displayed directory.

21. The system of claim 20, further comprising means, within said set-top terminal, for downloading selected programming in accordance with said selection received through said user input device and based on location information of said selected programming provided in said message.

22. The system of claim 21, wherein said means for downloading further comprises a tuner for tuning a data transport stream specified in said message in connection with said selected programming.

23. The system of claim 21, wherein said means for downloading further comprises means for connecting to a site identified by a URL specified in said message in connection with said selected programming at which said selected programming is stored.

24. The system of claim 20, further comprising means for checking a credit rating of said subscriber in response to said selection of programming, wherein said selected programming is downloaded only if said credit check of said subscriber is favorable.

25. The system of claim 18, wherein said transmitter specifically addresses said message to one or more set-top terminals in said cable television system.

26. The system of claim 25, further wherein said transmitter specifically addresses said message to set-top terminals of subscribers who have paid an additional fee specifically to receive said message.

27. The method of claim 1, wherein said directory further comprising a description of a function or functions of each listed programming object.

28. A method of advising a subscriber to a bidirectional cable television network of programming objects that may be purchased over the bidirectional cable television network to upgrade or enhance features provided by that subscriber's set-top terminal and for providing programming objects selected by said subscriber to that subscriber's set-top terminal, the method comprising:
   transmitting a message to said set-top terminal over a bidirectional cable line that provides a directory of programming objects available for purchase via an upstream communication on said bidirectional cable line and download over said bidirectional cable line associated with said cable television network; and
   including in said message a message version number that is incremented each time a change is made to said directory of programming objects in said message,
   wherein the message is transmitted in a sub-message with an out of band network message and the message identifies a location of the programming objects and entitlement control data structures corresponding to the programming objects, and
   wherein the entitlement control data structures are transmitted separately from the programming objects, whereby the set top terminal utilizes the entitlement control data structures to verify that an appropriate-code object has been received without alteration.

29. The method of claim 28, further comprising listing in said directory a fee charged for downloading each listed programming object.

30. The method of claim 28, further comprising displaying said directory of programming objects on a display device.

31. The method of claim 30, further comprising receiving a selection of at least one programming object from said directory through a user input device of said set-top terminal.

32. The method of claim 31, further comprising:

downloading selected a programming object in accordance with said selection received through said user input device;

acquiring an entitlement control data structure corresponding to the downloaded programming object.

33. The method of claim 28, further comprising charging said subscriber a fee for transmitting said message to said subscriber.

\* \* \* \* \*